(12) United States Patent
Hana et al.

(10) Patent No.: US 8,347,111 B2
(45) Date of Patent: Jan. 1, 2013

(54) DATA PROCESSING APPARATUS

(75) Inventors: Andrew Hana, Bristol (GB); Jonathan Peter Buckingham, Bristol (GB); Shiraz Billimoria, Bristol (GB); Dave Atkinson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 945 days.

(21) Appl. No.: 12/349,013

(22) Filed: Jan. 6, 2009

(65) Prior Publication Data

US 2010/0174848 A1    Jul. 8, 2010

(51) Int. Cl.
*G06F 21/00* (2006.01)
(52) U.S. Cl. ............................................ 713/189; 380/2
(58) Field of Classification Search .................. 713/164, 713/165; 711/100–105, 216, E12.001, E12.007, 711/E12.008, E12.018, E12.093, E12.098
See application file for complete search history.

(56) References Cited

U.S. PATENT DOCUMENTS

| | | | | |
|---|---|---|---|---|
| 5,954,817 A * | 9/1999 | Janssen et al. | ................ | 713/169 |
| 6,148,384 A * | 11/2000 | Devanagundy et al. | ...... | 711/163 |
| 6,585,166 B1 * | 7/2003 | Ookawa et al. | ................ | 235/492 |
| 7,826,614 B1 * | 11/2010 | Kaniz et al. | ..................... | 380/37 |
| 2002/0095573 A1 | 7/2002 | O'Brien | | |
| 2004/0160949 A1 * | 8/2004 | Kim et al. | ...................... | 370/352 |
| 2005/0005161 A1 * | 1/2005 | Baldwin | ........................ | 713/200 |
| 2005/0204091 A1 * | 9/2005 | Kilbuck et al. | ............... | 711/103 |
| 2006/0059373 A1 * | 3/2006 | Fayad et al. | .................... | 713/192 |
| 2006/0107032 A1 * | 5/2006 | Paaske et al. | ..................... | 713/2 |
| 2006/0149706 A1 | 7/2006 | Prang | | |
| 2007/0011736 A1 * | 1/2007 | Kalibjian et al. | ............... | 726/14 |
| 2007/0174916 A1 | 7/2007 | Ching | | |
| 2007/0283224 A1 | 12/2007 | Kirschner | | |
| 2007/0294496 A1 * | 12/2007 | Goss et al. | ..................... | 711/163 |
| 2008/0214300 A1 | 9/2008 | Williams | | |
| 2008/0276088 A1 * | 11/2008 | Ahlquist | ....................... | 713/168 |
| 2008/0317251 A1 * | 12/2008 | Foody | ........................... | 380/286 |
| 2010/0146302 A1 * | 6/2010 | Schoegler et al. | ............ | 713/193 |
| 2010/0174920 A1 | 7/2010 | Buckingham | | |

* cited by examiner

*Primary Examiner* — Gilberto Barron, Jr.
*Assistant Examiner* — Abdulhakim Nobahar

(57) ABSTRACT

A data processing apparatus comprises a monolithic integrated circuit having a data processor, a non-volatile memory storing at least one security code, and at least one interface at the boundary of the integrated circuit via which communication with the data processor can occur. Processing by the data processor of data received at the at least one interface is controlled by the at least one security code.

13 Claims, 4 Drawing Sheets

DATA PROCESSING APPARATUS

FIELD OF THE INVENTION

The present invention relates to a data processing apparatus, and a method of manufacturing the data processing apparatus.

BACKGROUND OF THE INVENTION

It is known to provide an integrated circuit containing, amongst other features, a data processor. In some applications it is necessary to ensure the data, including executable code, being processed cannot be changed by unauthorised people by accessing the data processor within the integrated circuit.

SUMMARY OF THE INVENTION

In accordance with one aspect of the present invention, there is provided a data processing apparatus comprising a monolithic integrated circuit having a data processor, a non-volatile memory storing at least one security code, and at least one interface at the boundary of the integrated circuit via which communication with the data processor can occur, processing by the data processor of data received at the at least one interface being dependent on the at least one security code.

Data in this context includes executable code. In one example, the security code in the non-volatile memory is used to prevent processing of data unless the data can be validated by the security code. In another example, the security code disables access to the data processor via the interface. Because access to the data processor is blocked, or prevented unless the data is validated, the security code cannot be changed by unauthorised access to the data processor.

In accordance with a further aspect of the invention, there is provided a method of manufacturing a data processing apparatus comprising a monolithic integrated circuit having a data processor, a non-volatile memory within the integrated circuit, and at least one interface at the boundary of the integrated circuit via which communication with the data processor can occur, the method comprising generating during manufacture and storing in the non-volatile memory at least one security code for controlling processing by the data processor of data received at the at least one interface.

Embodiments of the invention will be described by way of example only, with reference to the accompanying drawings.

DETAILED DESCRIPTION OF EMBODIMENTS OF THE INVENTION

Figure 1:
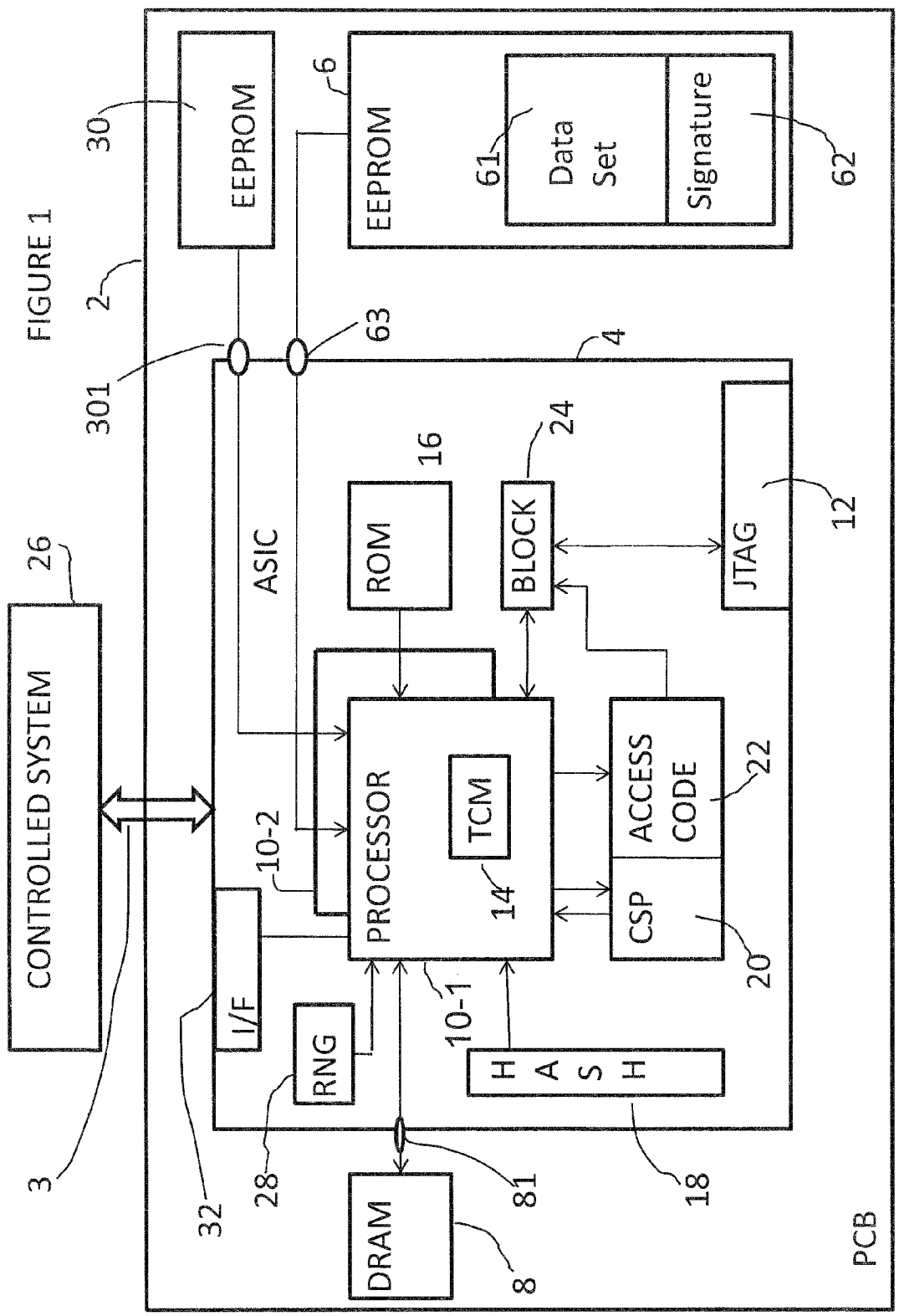
FIG. 1 is a schematic block diagram of a data processing apparatus in combination with a controlled system.

In this example the data processing apparatus is a microcontroller 2 for controlling a controlled system 26.

The following description initially describes the configuration of the microcontroller 2 and the contents of its various stores and memories as it would be used after manufacture.

Microcontroller 2 is coupled to a controlled system 26 via a port 3. The controlled system may for example be a back-up tape drive. In the case of a back-up tape drive it is important that the integrity of the backed up data is maintained. It is thus important that the integrity of the data and programs used by the microcontroller is maintained.

The microcontroller comprises a printed circuit board PCB 2 which comprises an ASIC (Application Specific Integrated Circuit) 4, a non-volatile memory 6 and a Random Access Memory 8. The non-volatile memory 6 may be any suitable type for example a Flash memory amongst other types. In this example it is a Read Only Memory, for example an EEPROM. The Random Access Memory 8 may be any suitable memory, for example an SRAM, but in this case it is a DRAM. The non-volatile memory 6 and the random access memory 8 are external to the ASIC 4. A further non-volatile memory 30 may optionally be provided on the PCB external to the ASIC and coupled to it via an interface 301.

The ASIC is a monolithic integrated circuit comprising: one or more processors 10-1, 10-2: tightly coupled memory 14 which may be an SRAM: a non-volatile boot ROM 16 containing code which is not modifiable; a hashing engine 18; one or more One Time Programmable (OTP) memories 20 and 22; a test port 12; an interface 32; interfaces 63, 81 and 301 coupled to the external memories 6, 8 and 30; a random number generator 28; and a hardwired test disabling circuit 24. The OTP memories 20 and 22 may be separate memories or sections of one memory. In this example they are sections of one memory. The test disabling circuit 24 is interposed between the test port 12, which in this example is a JTAG port, and the processor(s) 10. The disabling circuit 24 is responsive to data in the OTP memory section 22. The hashing engine 18 uses data (one or more keys) in the OTP memory section 20. The OTP memory section 20 stores critical security parameters (CSPs) including a secret key and at least one Public Key. Other keys may be filed in the OTP memory section 20. The secret key is unique to each instance of the microcontroller in one implementation of the invention.

The processor(s) 10 execute(s) instructions only from the tightly coupled memory 14 and from the DRAM 8. The boundary of the ASIC is a cryptographic boundary and data and program execution within it are regarded as secure as will be explained below. The EEPROM 6 and the DRAM 8 (and memory 30 if provided) are outside the cryptographic boundary and in the absence of security measures the contents of them would not be secure. The interfaces 12, 63, 301, 32 and 81 are at the physical and cryptographic boundary of the ASIC.

The contents of the DRAM 8 and EEPROM 6 are cryptographically protected by authentication codes. In this example the authentication codes used in the DRAM are of a different type to those used in the EEPROM. In this example, the content of the EEPROM 6 is made secure from undetected malicious modification at least by use of digital signatures. Also, the format of the data in the EEPROM is different from that in the DRAM The EEPROM 6 stores firmware which is arranged in one or more data sets 61 each with a digital signature 62. The digital signatures used in this example of the invention use public and private keys. Thus the details of the digital signatures will not be further described because they are within the knowledge of those skilled in the relevant art. When a data set is read from the EEPROM 6 its digital signature is checked by the processor(s) 10 and, if valid, the data set is processed by the processor(s) 10. The processor(s) 10 execute only validly signed firmware.

Figure 3:
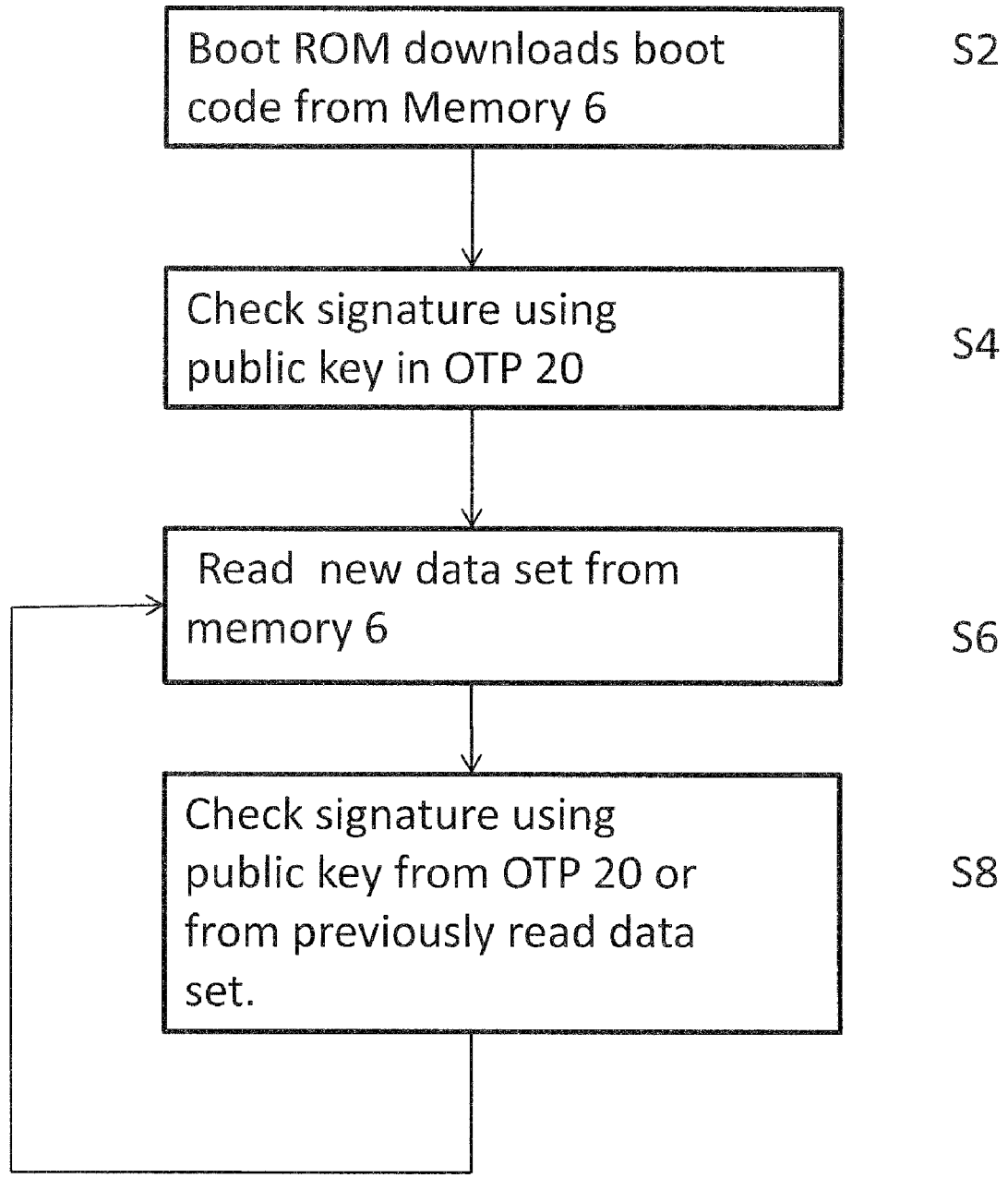
FIG. 3 is a diagram illustrating checking of digital signatures.

Referring to FIG. 3, in one example, the boot ROM 16 contains code which is used to read S2 a loader program from the EEPROM 6 to read further data sets from the EEPROM. A program counter (not shown) in the processor 10 is loaded with the start address of the boot ROM 15. The processor then executes the code in the boot ROM. That code may read a loader program from the EEPROM 6. The boot code within the boot ROM is deemed secure because it is within the cryptographic boundary. The loader program is protected by a digital signature which the boot ROM code checks S4 using the public key stored in the OTP 20. Subsequent data sets are read S6 using the loader program. The loader program and the subsequent sets have respective digital signatures and have one or more public keys embedded in them. The loader code checks S8 the signature of data set newly read from the EEPROM 6 using a public key embedded in a previously loaded data set or stored in the OTP memory 20.

Figure 4:
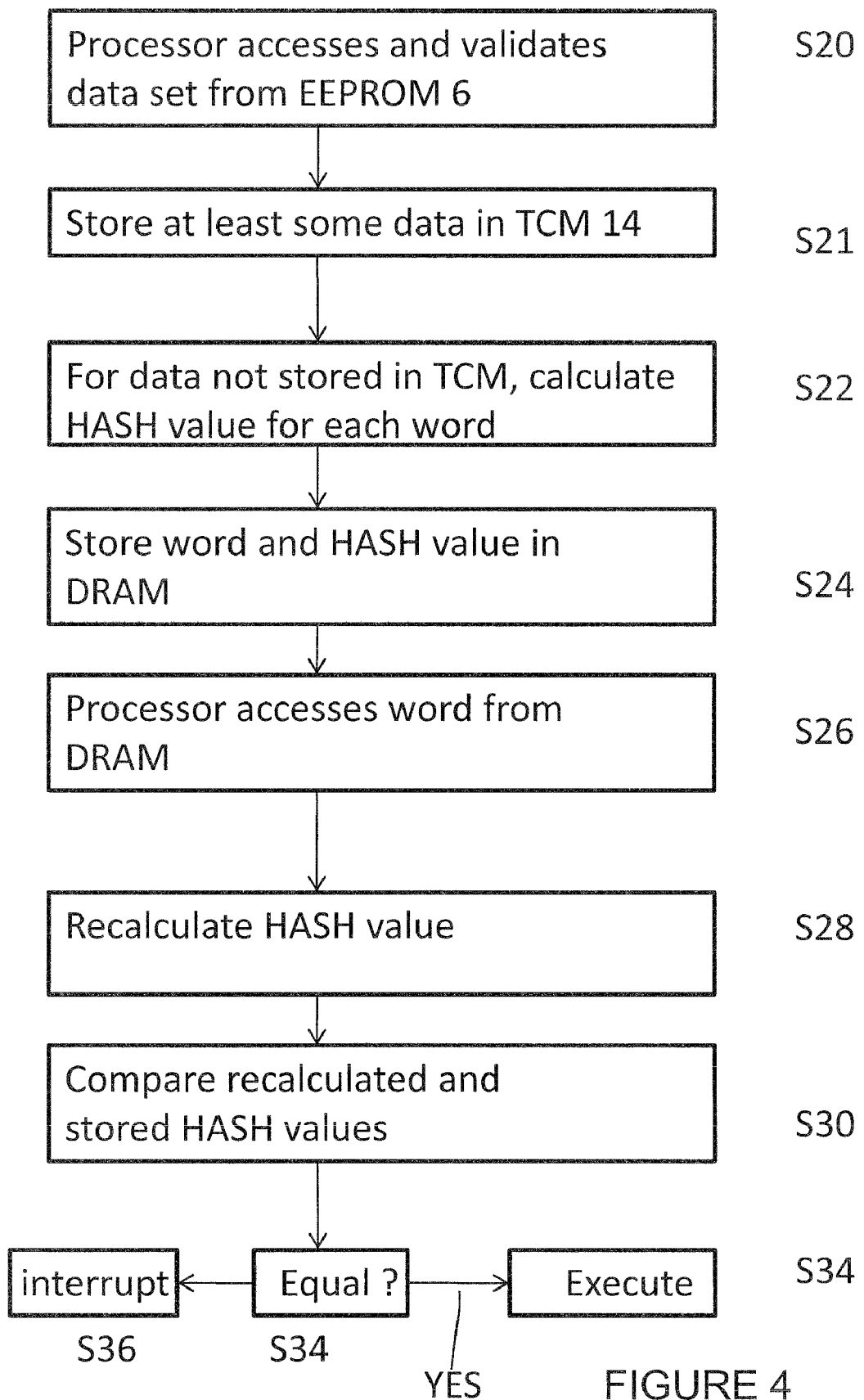
FIG. 4 is a flow diagram illustrating use of HASH functions in storing and retrieving data from a DRAM of the apparatus of FIG. 1.

A data set read from the EEPROM 6 may contain too much code/data of the firmware for the small amount of tightly coupled memory TCM 14 on the ASIC to store. The TCM 14 stores firmware code/data needed immediately by the processor(s) 10 and the remainder of the firmware data set is transferred to the DRAM 8. Because the DRAM 8 is outside the cryptographic boundary, the code/data stored in it is cryptographically protected by authentication codes. Referring to FIG. 4, data is read as a data set from the EEPROM 6, and is written to, and read from, the DRAM 8 as words. In this example, when a data set is read from the EEPROM S20, it is validated as described with reference to FIG. 3. At least some of the data of the set is stored in the TCM 14 in step S21. The remaining data of the set is processed and stored in the DRAM 8 as follows. The processor(s) 10 operate with the hashing engine 18 to calculate S22, for each word of the remaining data, a hash value and store S24 the hash value in the DRAM at a location associated with the stored word. Word size is chosen to suit system constraints. It could be as small as one byte. In practice it may be 32 bits. When a word is read S26 from the DRAM 8 the processor 10 and the hashing engine recalculate the hash and compare S30 the recalculated hash with the corresponding hash value stored in the DRAM. If the hash values have a predetermined relationship S34, e.g. they are equal, the read data is processed S38 by the processor(s) 10. If they do not have the predetermined relationship then processing is interrupted S36 and/or an error message generated and/or the data/code ignored.

Storing words in the DRAM with respective authentication codes facilitates random access to the words by the processor(s) 10.

The hash function may be any suitable hash function. An example is the well known HMAC function. In this example, the HASH function uses the secret key stored in the OTP memory 20. It could use another key stored in the OTP memory. An example of the hash value is HMAC (address||data||secret key) where || indicates concatenation. The HASH value has at least sufficient bits, taking account of the number of bytes the DRAM can store, to avoid, or at least reduce the chance of, duplication of HASH values within the DRAM. The number of bits of the HASH value may be at least 96 bits and may be much larger. The industry standard is 160 bits which reduces the likelihood of duplications of hash values to a sufficiently low level.

Providing the cryptographic boundary and protecting data stored in the DRAM 8 and EEPROM 6, protects the microcontroller from unauthorised access to the programs and data used by the processor(s) in normal operation. However, the JTAG test port could provide access to the processor(s) 10 in a test mode using known EMULATE and TRACE routines and allow program changes to be made. The JTAG test port is needed for testing at least during manufacture and may be used to diagnose faults after manufacture.

To prevent unauthorised use of the test port, the OTP memory 22 contains at least one security bit which, with the disabling circuit, 24 disables the port 12.

Figure 2:
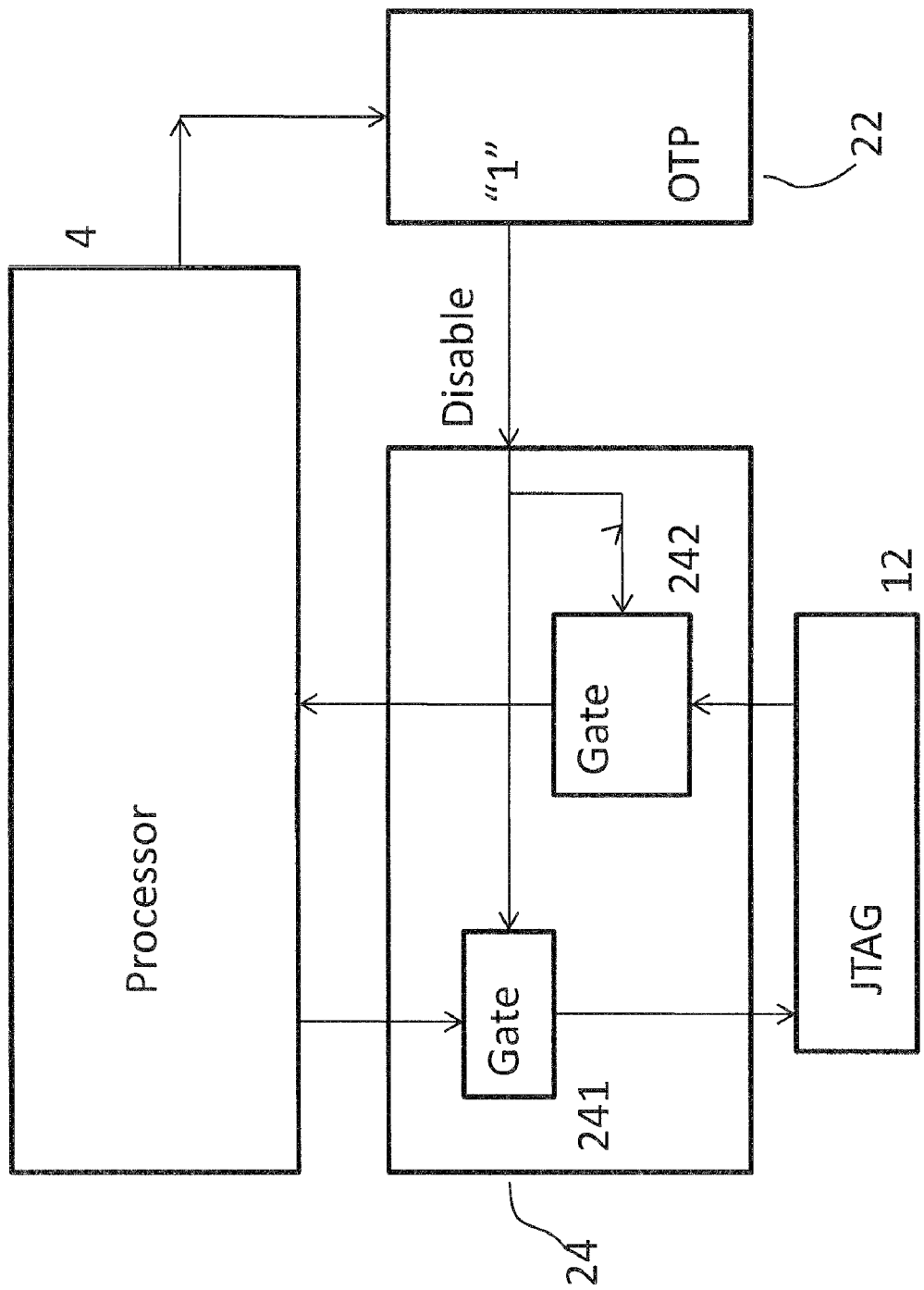
FIG. 2 is a schematic block diagram of a circuit for disabling a test interface of the apparatus of FIG. 1.

In one example the OTP memory 22 contains only one bit. The OTP memory 22 allows a bit to be changed only once from one state e.g. "0" to the opposite state "1". During manufacture of the microcontroller the bit is "0" allowing testing and the bit is set to "1" before the microcontroller is released for use. Referring to FIG. 2 the JTAG port 12 has a serial input and a serial output. The disabling circuit, which is part of the integrated circuit ASIC, has a gate 241 interposed between the serial output and the processor(s) 10 and a gate 242 interposed between the serial input and the processor(s) 10. The security bit "1" in the OTP disables the gates 241 and 242. Because the security bit is not changeable the test port is secured against use after manufacture of the microcontroller.

In another example, OTP memory 22 has a two bit security code, which is initially "00". That allows testing during manufacture, after which the code is set to "01", i.e. one of the two bits is set to "1". That code "01" disables the gates 241 and 242. If a fault occurs, then the microcontroller is returned to the manufacturer who sets the other bit to "1" resulting in code "11" which allows testing via the port 12. Access to the OTP memory 22 to change the security code can be provided by suitable access code signed with a digital signature which can be verified by a key stored in the OTP memory 20. The key is for example the default public key stored in the memory 20. That allows the security code to be changed to "11" allowing testing via the port 12. The original microcontroller is retained by the manufacturer and the user receives a new microcontroller.

In a further example, the security code may have three or more bits changeable with use of the signed access code. During manufacture, the code is "000" and when released to a user is "001". If a fault occurs the code is changed to "011" by the manufacturer to allow testing. After testing the code is changed to "111", securing the port 12 against use, allowing the microcontroller to be returned to the user. Only signed access code, signed with a digital signature which is verified by a key held in the OTP memory 20 can be used to change the code stored in the OTP memory 22.

Security codes of two or more bits provide an audit trail of testing (or any unauthorised attempts at testing) after manufacture.

Further Interface and Further EEPROM

As shown in FIG. 1, the ASIC may have at least one interface 32 additional to the ports 3 and 12. That interface may be an Ethernet port or a fibre channel port.

The microcontroller may additionally have the further non-volatile store 30 outside the ASIC storing data cryptographically protected by a security parameter stored in the OTP memory 20. The further non-volatile memory 30 is coupled to the ASIC via the interface 301.

The further non-volatile store 30 may be an EEPROM. The further store 30 may store further critical security parameters outside the ASIC. The further parameters are encrypted and have digital signatures to make them secure. The further parameters are encrypted using the secret key, unique to the ASIC, stored in the OTP memory 20. The digital signatures of the further parameters are produced using the unique secret key stored in the OTP memory 20. That secret key is used to decrypt the further security parameters and to check the digital signatures read from the further store 30.

The further non-volatile store may contain other encrypted and/or digitally signed data.

The further security parameters outside the ASIC can be used to make secure data and code communicated via the interface(s) 32.

Manufacture of the Microcontroller.

During manufacture, the boot code is hard coded into the boot ROM 16; the loader program and other code/data is stored in the EEPROM with digital signatures based on the public and private keys; and at least one public key is stored in the OTP memory 20. The secret key is not stored in the OTP 20 until after the security code is set in the OTP 22 disabling the test port. The ASIC contains a random number generator RNG 28. Firmware stored in the tightly coupled memory 14 or the DRAM 8 reads a random number of for example 256 bits from the random number generator and stores it in the OTP 20 as the secret key without leaving the ASIC. This is done after the test port is disabled to prevent access to the secret key even by those having access to the manufacturing process.

The hash function may be any suitable hash function and is not limited to the example of HMAC as described above.

The on-chip random number generator 28 could be omitted from the integrated circuit and an off chip generator used instead to generate the secret key during the manufacturing process. However a random number generator on the chip is more secure.

The firmware stored in the EEPROM 6 is cryptographically protected, in this example, by digital signatures. During manufacture firstly, the firmware is compiled. It is then digitally signed using a secret private key of a private-public key system. The public key is stored in the OTP memory 20. The signed firmware is stored in the EEPROM 6. The digital signatures may be created by submitting the compiled firmware to a secure signature generator during the manufacturing process. The signed firmware may down loaded to the EEPROM 6 via a communications link e.g. the Internet.

Instead of an EEPROM, the non-volatile store 6 may be any other suitable device for example a FLASH memory.

The further non-volatile store 30 may be a serial EEPROM.

The one-time programmable memory OTP 22 containing the security code(s) may be replaced by a reprogrammable non-volatile memory and the security code changed using signed firmware. A one-time programmable memory 22 is more secure since its programming is irreversible.

The DRAM may be protected by physically making access to the DRAM very difficult and detectable if tried. For example the connections between the DRAM and the ASIC may be buried in layers of the PCB 2 or otherwise protected against physical probing. Such physical protection may be used additionally to the protection of the data provided by the use of hashes as described above or, in some examples, be used instead of hashes. If hashes are not used the hash generator 18 may be omitted.

The whole microcontroller may be enclosed in a tamper proof housing having tamper evident seals.

Although the invention has been described by way of example with reference to an ASIC, it is not limited to an ASIC. The invention may be applied to other types of integrated circuit data processors The embodiments of the invention store data outside the integrated circuit. The embodiments of the invention ensure the data, including executable code, being processed cannot be changed by unauthorised people accessing the data stored outside the integrated circuit or if it is so accessed ensuring it cannot be changed undetectably. Security is provided by security data and the security data is itself secure because it is stored within the integrated circuit and protected from unauthorised access.

The invention claimed is:

1. A data processing apparatus comprising:
   an integrated circuit having a data processor,
   a non-volatile memory storing at least one security code,
   at least one interface at a boundary of the integrated circuit via which communication with the data processor can occur, and
   a disabling circuit to disable the interface in response to the security code stored in the non-volatile memory having a particular value, where disabling the interface blocks access to the data processor via the interface, wherein the disabling circuit has a gate interposed between the interface and the data processor, wherein the gate is disabled by the security code having the particular value, wherein disabling the gate prevents access of the data processor via the interface, wherein the gate is enabled by the security code having a second value, wherein enabling the gate allows the data processor to be accessed via the interface, and wherein the data processor is to perform testing in response to access through the interface when the gate is enabled.

2. The apparatus according to claim 1, wherein the non-volatile memory is a one-time programmable memory.

3. The apparatus according to claim 1, wherein the non-volatile memory stores a second security code, wherein the integrated circuit has a second interface, and wherein the data processor is to check validity of data received via the second interface using said second security code stored in the non-volatile memory.

4. The apparatus according to claim 1, wherein the non-volatile memory stores a decryption key, wherein the integrated circuit has a second interface, and wherein the data processor is to decrypt encrypted data received via the second interface using the decryption key stored in the non-volatile memory.

5. The apparatus according to claim 1, wherein the security code includes a single binary bit.

6. The apparatus according to claim 1, wherein the security code includes two or more binary bits, the bits being set to the particular value to cause the disabling circuit to disable access to the data processor via the port.

7. The apparatus according to claim 1, wherein the non-volatile memory stores a second security code, the apparatus further comprising a non-volatile store external to the integrated circuit storing data to be processed by the data processor, the data being cryptographically protected in the external store, the non-volatile memory storing a validation key, and the data processor to validate a program read from the non-volatile store using the second security code before validating data read from the non-volatile store using the validation key.

8. The apparatus according to claim 1, further comprising a further store external to the integrated circuit for storing data for use by the data processor, and a hash calculator within the integrated circuit, the further store being coupled to the data processor via a second interface at the boundary of the integrated circuit to receive words from the data processor, the data processor and hash calculator being arranged to:
   calculate for each of the words a hash value dependent on a second security code stored in the said non-volatile memory and store the hash value in association with the corresponding word in the further store,
   retrieve from the further store stored words, recalculate a hash value for each retrieved word using the second security code, and compare the recalculated hash value with the corresponding stored hash value, and allow the retrieved word to be processed by the data processor only if the recalculated and stored hash values have a predetermined relationship.

9. A method of manufacturing a data processing apparatus comprising a monolithic integrated circuit having a data processor, a non-volatile memory within the integrated circuit, at least one interface at a boundary of the integrated circuit via which communication with the data processor can occur, and a disabling circuit, the method comprising generating during manufacture and storing in the non-volatile memory at least one security code for use by the disabling circuit to disable the interface in response to the security code having a particular value, where disabling the interface blocks access to the data processor through the interface, wherein the disabling circuit has a gate interposed between the interface and the data processor, wherein the gate is disabled by the security code having the particular value, wherein disabling the gate prevents access of the data processor via the interface, wherein the gate is enabled by the security code having a second value, wherein enabling the gate allows the data processor to be accessed via the interface, and wherein the data processor is to perform testing in response to access through the interface when the gate is enabled.

10. The method according to claim 9, further comprising running a program, during manufacture, which generates, and stores in the non-volatile memory, the security code which disables access to the data processor via the port.

11. The method according to claim 10, wherein the program is cryptographically protected at least by an authentication code, the method comprising storing a cryptographic parameter in a cryptographic parameter store in the integrated circuit during manufacture, and authenticating the program using the stored parameter to allow the security code to be set.

12. The method according to claim 11, comprising, after setting the security code, generating in the integrated circuit a secret key and storing the secret key in the parameter store.

13. The method according to claim 9, wherein the non-volatile memory is a one-time programmable memory.

* * * * *